United States Patent [19]
Antoniuk et al.

[11] 4,192,228
[45] Mar. 11, 1980

[54] METHOD TO EXPRESS LIQUID FROM WET FIBROUS MATERIAL

[75] Inventors: Andrew V. Antoniuk; Lawrence V. Hankinson; David M. Boulter; William R. McMillan, all of Edmonton, Canada

[73] Assignee: Celanese Canada Limited, Montreal, Canada

[21] Appl. No.: 466,349

[22] Filed: May 2, 1974

Related U.S. Application Data

[62] Division of Ser. No. 235,739, Mar. 17, 1972, abandoned.

[51] Int. Cl.² .............................................. B30B 9/20
[52] U.S. Cl. ...................................... 100/37; 68/244; 100/121
[58] Field of Search ................... 100/37, 121; 68/244; 162/205, 210, 224, 157 C

[56] References Cited

U.S. PATENT DOCUMENTS

| | | | |
|---|---|---|---|
| 976,551 | 11/1910 | Coenen | |
| 1,369,335 | 2/1921 | Goodfellow | 100/121 |
| 2,069,448 | 2/1937 | Ireland et al. | 100/121 X |
| 2,083,817 | 6/1937 | Berry | 162/205 X |
| 2,498,773 | 2/1950 | Thompson | 536/77 |
| 2,685,548 | 8/1954 | Drozdowski | 68/244 X |
| 3,238,866 | 3/1966 | Strindlund | 100/121 X |
| 3,527,668 | 9/1970 | Kusters et al. | 100/121 X |

*Primary Examiner*—Philip R. Coe
*Attorney, Agent, or Firm*—Roderick B. Macleod

[57] ABSTRACT

An apparatus and a method to express liquid from wet fibrous material while minimizing breakage thereof and splashing of the solvent and easying solvent recovery. The method comprises laying said material on a smooth perforated surface, gradually compressing said body of wet fibrous material against said surface to force out liquid, and removing from said surface said body of material in a drier state. A convenient way to compress said body is by exerting on it a gradually increasing compression by means of a second roller having a smooth surface. The apparatus comprises a first roller being drivenly mounted for advancing a wet fibrous material, said first roller having smooth, perforated surface to receive the liquid from said wet fibrous material, a second roller being freely rotatably mounted over said first roller, said second roller having a smooth surface, means to urge said rollers against one another and thereby compress said wet fibrous material and obtain a drier material, means to disengage said drier material from said first roller. Conveniently the said disengaging means is a scraper blade, spring loaded to force it against the first roller.

3 Claims, 3 Drawing Figures

METHOD TO EXPRESS LIQUID FROM WET FIBROUS MATERIAL

This is a division of application Ser. No. 235,739, filed Mar. 17, 1972, and now abandoned.

This invention relates to an apparatus and a method to express liquid from wet fibrous material while substantially minimizing breakage of said fibrous material. Particularly, this invention is directed to the removal of liquid from fibrous material having low tenacity fibres.

THE PRIOR ART

Domestic wringers are known to squeeze out water from clothes by means of a pair of supporting shafts covered with soft rubber like substances. However, for commercial purpose, apparatus such as crushers are generally used to cause extraction of juice or liquid by means of rollers having rough surfaces. The material to be treated (for example sugar canes), is placed between the rollers which exert high pressure. Similar systems are also used in the pulp and paper industry. In the case of loosely bound material or material having low tenacities, such pressures tend to disintegrate, tear apart, break and disperse the material in the liquid. This is a serious problem if the liquid is intended to be re-used. Complex purification steps are required. Splashing of the solvent is another problem which occurs, decreasing thereby the amount of liquid to be recovered. When the material is a fibre, fibre breakdown tends to produce a high level of fines. Which, create process problems in the washing and drying operations. Also there fines cause detrimental effects on product quality. Furthermore fibres tend to adhere to rollers having no smooth surface.

Broadly stated, there has now been found a method to remove liquid from a wet fibrous material, especially one which is loosely bound, comprising:

(a) laying said material on a smooth perforated surface (b) gradually compressing said body of wet fibrous material against said surface to force out liquid, and (c) removing from said surface said body of material in a drier state. A convenient way to compress said body is by exerting on it a gradually increasing compression by means of at least one roller having a smooth surface.

There has also been found an apparatus therefor, comprising:

(a) a first roller being drivenly mounted for advancing a wet fibrous material, said first roller having a smooth, perforated surface to receive the liquid from said wet fibrous material, (b) a second roller being freely rotatably mounted over said first roller, said second roller having a smooth surface, (c) means to urge said rollers against one another and thereby compress said wet fibrous material and obtain a drier material.

(d) means to disengage said drier material from said first roller. Conveniently the said disengaging means is a scraper blade, spring loaded to force it against the first roller.

This invention is useful for dewatering acid saturated cellulose acetate obtained from the acetylation of cellulose, in particular cellulose acetate slurries and acetate flakes saturated with acetic acid and water.

Referring now to the drawings which illustrate embodiments of the invention:

Figure 1:
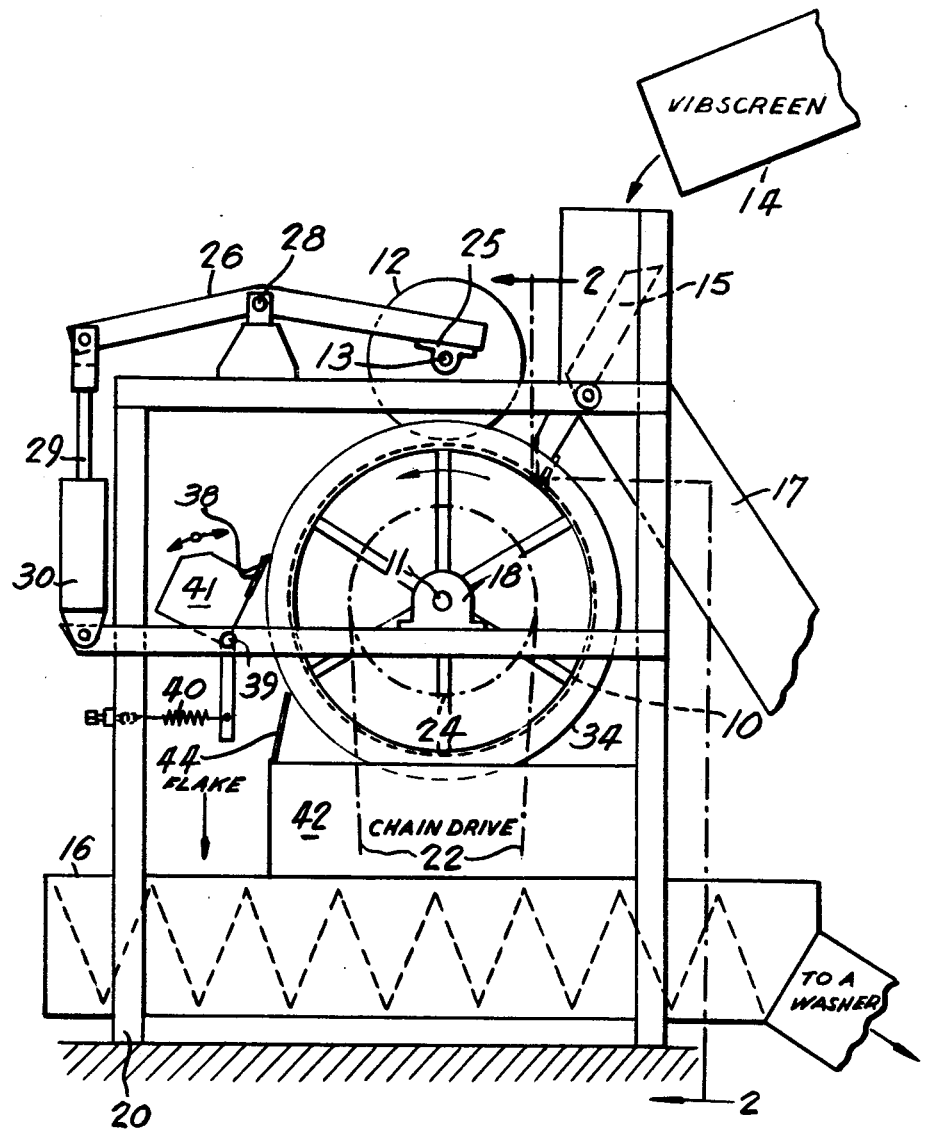
FIG. 1 is a side view in elevation of an apparatus to remove liquid from wet material.

Referring now to FIG. 1, the apparatus comprises:

a pair of squeezing rollers 10 and 12, a device for feeding wet material on the smooth surface of roller 10, (for instance: a vibrating screen 14 provided with an inclined chute 15,)

and a device 16 for taking or receiving from said squeezing rollers the material free from liquid, (for instance: a screw conveyor.)

The first roller 10 is provided at the two longitudinal ends with axial shafts 11. These shafts are rotatably mounted on bearings 18 which rest on a supporting frame 20. The roller 10 is chain driven by a motor, not shown, actuating a chain 22 which engages the sprockets of a large gear 24 rigid with the roller 10. On top of said roller 10, a second roller 12 is rotatably mounted on bearings 25 by means of axial shafts 13. The levers 26 are suspended by a fulcrum pin contained in box 28. The roller 12 is urged against the first roller 10 by means of piston arms 29 and cylinders 30 fixed to frame 20 and transmitting to levers 26 a given pressure. The first roller 10 is preferably much larger than roller 12 to enable proper laying of material on this first roller 10.

Figure 2:
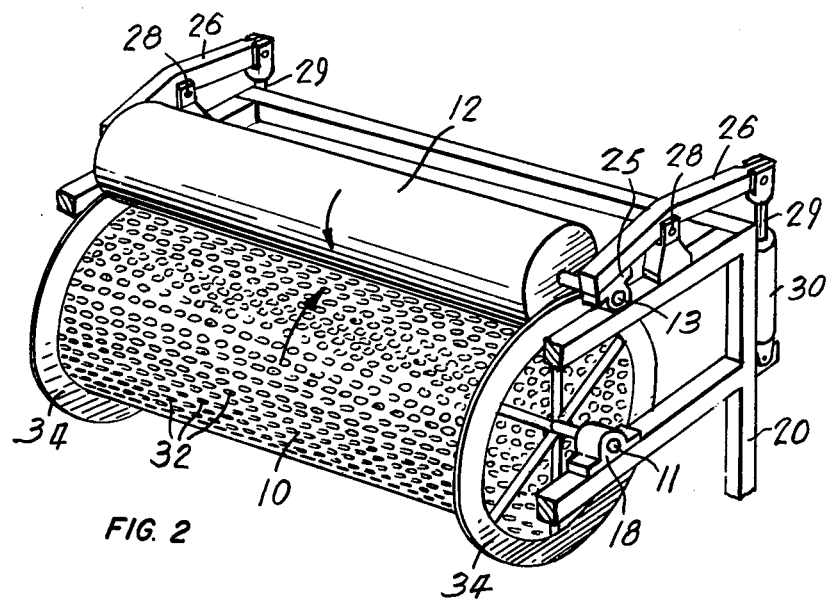
FIG. 2 is a perspective view taken along the line 2—2 of FIG. 1 with the screw conveyor removed.

As shown in FIG. 2 the first roller 10 has a smooth surface which is provided with a plurality of perforations 32. If desired, the chute 15 may be provided with a by pass 17 and the chute 15 may be a flap gate chute as shown at 15. Depending upon the application and the amount of liquid to be removed, the perforations may cover from about 5% to 50% of the total perforated surface area, generally about 10–50%, preferably 40% of the total area or about 66% of the unperforated area, bearing in mind that as the perforated area increases, the tensile strength of the unperforated area decreases, while the pressure required on the wet material to remove the liquid decreases. In other words, the pressure to be exerted by the cylinder 30, and consequently on the material, decreases as the perforated area on roller 10 increases. As a result, the material has a lesser tendency to disintegrate, tear apart, break, etc. Also the perforations help feed fibre into the nip by reducing slippage. The second roller 12, which has a smooth surface and which is idling, or freely rotating, also tends to prevent this tearing apart and breakage as it rotates at the velocity of the material moving along roller 10. The roller 10 is provided with flanges 34 and 36 that confine the material and the liquid on roller 10.

Referring to FIG. 1, an adjustable knife with renewable tip 38 is rotatably mounted on axis 39 and urged by an adjustable spring 40 against the smooth surface of the roller 10 to remove the material substantially free from the liquid. The knife is provided with sides 41 that confine the material within the boundaries of the knife. The material thereby falls by gravity into a device for collecting such material, for instance, screw conveyor 16. Other taking-up devices may be used if desired. Under the roller 10 a tank 42 is provided for collecting the liquid removed from the material. Preferably at the lower portion of the roller 10 a deflector 44 is provided so that any material that gets past tip 38 is diverted back into the screw conveyor 16.

By selecting rollers that have large diameters the following advantages are generally obtained for application of this apparatus for the dewatering of cellulose acetate fibres:

Rollers that have great diameters are selected because the more nearly vertical will be the entering pressure, the smaller will be the horizontal force in opposition to the flow of fibre into the nip. This ensures a good feed with no plug ups.

Also large rollers allow gradual compression into nip, and thereby reduces the chances of the machine not being able to cope with the feed.

Large rollers allow a greater number of perforations 32 to be available at the nip for liquid removal.

Large bottom roller 10 enables the fibre to be fed well back from the nip without slippage occurring.

Feeding the material well back on the bottom roller also enables the fibre to be evenly distributed and any free liquid has time to drain through the perforations prior to compression. This allows maximum use of the compression effort.

OPERATION

On vibrating at 14, the wet material is allowed to fall into the feed chute 15 which distributes in onto the first roller 10 in between the flange 34 and 36. The material is conveyed on roller 10. Upon contact with the second roller 12, the material is gradually pressed against the smooth surface of roller 12 and thereby the liquid is easily moved through the perforations 32 and down to the tank 42. Because of these perforations, lower pressures are sufficient to effectively remove the liquid from the material. Since low pressure is required, and the second roller 12 has a smooth surface and is freely rotating, the material is not torn apart or sheared; and when filaments are present, they tend to remain unbroken even in the case of unbound filaments.

By laying the wet material such as wet cellulose acetate fibres down on roller 10 in an even manner, and applying a gradual compression to this bed of fibre, the liquid is forced to flow through the bed of fibre towards and out of the perforations. As a result the fibres tend to be held back in the fibre bed which acts as a 'filter' for them. Pressure of generally up to about (30 lbs./in 2) to (100 lbs./in 2), are applied on roller 12 and preferably 50.

After the material is freed from liquid, it may be disengaged from the roller by means of the knife 38. The material thereby falls by gravity and may be collected by the conveyor or any other means. The liquid thus recovered from tank 42 has a lesser degree of fines. This liquid may be pumped off. A small recycle stream may also be provided back to the tank in order to prevent any build up of fines on the bottom of the tank.

The following will now serve to illustrate embodiments of the invention.

EXAMPLE 1

An apparatus as shown in FIGS. 1 and 2 was used. The two rollers were each three feet six inches long, set one above the other. The diameter of top roller was approximately half the diameter of the bottom roller which was four feet diameter. This difference in diameters was to allow adequate space for wet cellulose acetate flakes being fed to an inclined chute and onto the bottom perforated roller. The flakes contained 80% moisture: a mixture of water and mineral acids. Squeezing and dewatering took place at the nip due to the force extended on the top solid roller by means of two air cylinders and a transmitting lever. The liquid was removed through 5/16" diameter holes in the bottom roller and was collected in the tank. This bottom roller had an open area of about 40%.

The bottom roller was driven at 5 r.p.m. by a 10 HP motor via a Hansen reducer, the final drive being by chain and sprocket. The top roller was allowed to idle. The nip pressure was manually varied by adjusting the air pressure to the cylinders.

The squeeze flake was removed from the bottom roller by a spring loaded doctor blade running the full length of the roller. A deflector plate was also used to take off any material passing the doctor blade. A screw conveyor was carrying the squeezed flake away from the rollers. The liquid removed was pumped away.

A small recycle stream was also provided back to the tank to prevent any build up of cellulose flake partials or fines on the bottom of the tank.

The apparatus was in continuous operation for about three months at the rate of about 7,000 lb per hour. Flake handling into and out of the apparatus worked well and never plugged up. Flakes getting by the doctor blade, particularly at either end where the blade fits into the flance of the bottom roller were caught by the deflector plate behind and below the blade thereby preventing these flakes from collecting in the tank.

The flanges on the bottom roller have also prevented any loss of flakes as they were conveyed, squeezed and discharged.

A 2" to 3" thick by 36" wide feed was thereby squeezed in the roller nip to give a mat ½ to 1" thick×36" wide. Dewatering took place over a 3" to 4" section of the roller at the nip. The dewatering holes show no signs of permanently plugging. Individual holes occasionally became plugged but cleared out after the next revolution.

Figure 3:
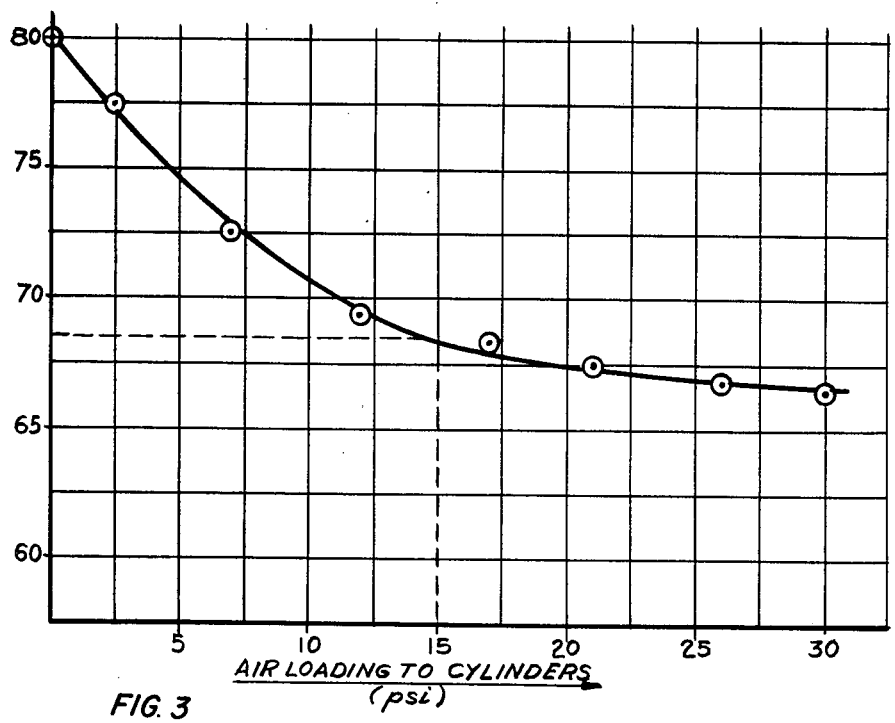
FIG. 3 is a graph showing the effect of pressure on liquid removal (i.e. acid) effectuated according to the invention.

There is a direct relationship between the nip pressure (expressed as an air loading pressure) and the squeezed flake moisture. As may be seen from FIG. 3 wherein the pressure exerted on the flakes by urging the rollers against one another is expressed in p.s.i. gauge and shown in the abscissa and the % of moisture removal is shown in the ordinate.

SAMPLE A

The same as in Example 1 was repeated except that the bottom roller had no perforation. Although dewatering was achieved under higher pressure liquid removal away from the roller nip was a problem. It rewetted the flake leaving the machine and formed a slurry of the flake entering the machine. Fines level was high in liquid removed.

EXAMPLE 2

The machine consisted of two cylindrical rollers each three feet in diameter by three feet long, set one above the other so that a line drawn between their centres would form a 20° angle with the vertical. It was necessary to offset the rolls in this manner in order to provide adequate space for the flake feed. An adjustable inclined chute fed the material direct from a vib-screen on to the bottom roller where it was conveyed into the roller nip. Flake squeezing and dwatering was effected at the nip, and the acid water was removed through ¼" diameter holes in the bottom roller.

The bottom roller with an open area of 4% or 6.5 sq. inch distributed as ⅜ diameter inch holes was driven at 6 rpm by a 10 HP motor via a reducer. The top roller was allowed to "free wheel" and was pivoted to allow it to adjust itself to the varying feed mat thickness. This also ensured a constant pressure on the squeezed flake mat. The nip pressure was varied.

The squeezed flake mat was scraped off the bottom roller by a spring loaded doctor blade running the full length of the roller. A screw conveyor carried the dried material. The acid water was collected.

MATERIAL HANDLING

Material handling into and out of the squeeze roller using the inclined feed chute and discharge conveyor worked well. The feed chute worked best at angles 50° to 70° with the horizontal. No plug ups or flakes slippage occurred. The doctor blade successfully removed all the flake from the bottom roller. Surprisingly enough, squeezed flake did not adhere to the top roller.

SQUEEZING ACTION

The 2"–5" thick×24" wide feed flake was squeezed in the roller nip to give a mat ¼" to 1" thick×30" wide. The top idler roller automatically adjusted to cope with the varying feed, while still exerting the same nip pressure on the flake.

The acid water was displaced at the nip and was forced down and back into the feed, eventually being forced out through the holes in the bottom roller. Dewatering appeared to take place over a 3"–4" section of roller, starting at the nip. These dewatering holes showed no signs of plugging. Some fines did pass through the holes but the amount was no more than is lost through vib-screens or washer screens.

EFFECT OF PRESSURE

Increased nip pressure resulted in more acid water removal and hence a lower flake moisture.

Maximum effective dewatering capacity of this machine was reached when water could not be removed since the whole dewatering capacity had been reached.

The amount of acid leaving the rollers was reduced by approximately half the original amount.

The wash water was increased to the washers by 40% without any trace of liquid slip-over from the flake feed end. Without the rollers, this slip-over limits the wash water flow and results in a lower washing effeciency and an increased acid water acidity.

The acid water acidity leaving the washers fall from 17–18% to 10–11% acetic acid. The acid content of the flake leaving the rollers was reduced by approximately one-third. To remove more acid and obtain flake moisture below 70% a greater drainage area was used. This was achieved by increasing the number of holes per square inch, increasing the roller diameter and by lengthening the rollers.

The embodiments of the invention in which an exclusive property or privilege is claimed are defined as follows:

1. In the acetylation of wood, a method to further reduce the acidity of the resulting product consisting of a body of wet loosely bound cellulose acetate fibrous material without substantially breaking the fibers of the fibrous material and thereby minimizing loss of the fibrous material, comprising:
   1. depositing said fibrous material containing acid over a smooth perforated cylindrical surface having from about 4 to 50% of the total area perforated;
   2. rotating said cylindrical surface to bring said fibrous material into contact with a smaller freely rotatable roller mounted above said cylindrical surface;
   3. gradually compressing said body of wet fibrous material against said cylindrical surface to a pressure of about 30 lbs. per square inch to about 100 lbs. per square inch, by rotating said cylindrical surface past the nip formed by said cylindrical surface and said freely rotatable roller;
   4. removing said fibrous material in a drier state.

2. The method according to claim 1 wherein the pressure exerted on the material is gradually increased up to about 50 lbs per square inch against a smooth surface having 4% of the total area perforated.

3. The method according to claim 1 wherein the perforated surface consists of a plurality of holes having about 5/16–⅜ inch diameter.

* * * * *